US012759078B2

(12) United States Patent
Lai et al.

(10) Patent No.: US 12,759,078 B2
(45) Date of Patent: Oct. 13, 2026

(54) STEEL PLATE ASSEMBLY WELDED BY LASER WELDING AND LASER WELDING METHOD THEREOF

(71) Applicant: TAIWAN MASK CORPORATION, Hsinchu County (TW)

(72) Inventors: Li-Wen Lai, Hsinchu County (TW); Wei-Lun Tsai, Hsinchu County (TW); Ching-Cheng Chen, Hsinchu County (TW); Chih-Hui Tai, Hsinchu County (TW); Hsin-I Ho, Hsinchu County (TW)

(73) Assignee: TAIWAN MASK CORPORATION, Hsinchu County (TW)

( * ) Notice: Subject to any disclaimer, the term of this patent is extended or adjusted under 35 U.S.C. 154(b) by 291 days.

(21) Appl. No.: 18/586,824

(22) Filed: Feb. 26, 2024

(65) Prior Publication Data

US 2025/0269468 A1 Aug. 28, 2025

(51) Int. Cl.
*B23K 26/26* (2014.01)
*F16B 5/08* (2006.01)

(52) U.S. Cl.
CPC ................ *B23K 26/26* (2013.01); *F16B 5/08* (2013.01)

(58) Field of Classification Search
CPC ........ B23K 26/24; B23K 26/26; B23K 26/06; B23K 26/062; B23K 26/073; B23K 26/0734; B23K 26/0736; B23K 2103/04; B23K 2103/05; F16B 5/08
See application file for complete search history.

(56) References Cited

U.S. PATENT DOCUMENTS 5,595,670 A * 1/1997 Mombo-Caristan ... B23K 26/06 219/121.64
8,890,030 B2 * 11/2014 Lin ........................ B23K 31/02 228/175
10,384,293 B2 * 8/2019 Peters .................... B23K 28/02
10,427,245 B2 * 10/2019 Tatsumi ............... B23K 26/146
10,493,555 B2 * 12/2019 Setoda ................... B23K 10/00
10,940,562 B2 * 3/2021 Finuf ................. B23K 26/0608
11,612,957 B2 * 3/2023 Zediker .............. B23K 26/0626 219/121.64
11,958,131 B2 * 4/2024 Lee ...................... B23K 26/211
(Continued)

FOREIGN PATENT DOCUMENTS

CN 113182675 A 7/2021
CN 113182687 A 7/2021
CN 114473199 A 5/2022
(Continued)

*Primary Examiner* — Jonathan P Masinick
(74) *Attorney, Agent, or Firm* — Rosenberg, Klein & Lee

(57) ABSTRACT

A steel plate assembly welded by laser welding and a laser welding method thereof are disclosed. The steel plate assembly comprises two steel plates and a molten region. The steel plates are joined. A joint face of the steel plates extends along a joint line. The molten region extends along the joint line. The molten region has a molten depth of between 20 and 50 mm. The molten region has a molten width of between 4 and 7 mm. The molten region is formed by welding the joint face using a laser. After the molten region is cooled and solidified, the steel plates are combined with each other. The molten depth is 20 to 50 millimeters, so the laser welding method is applicable to thicker steel plates.

10 Claims, 8 Drawing Sheets

(56) References Cited

U.S. PATENT DOCUMENTS

2015/0314393 A1* 11/2015 Woo .................... B23K 26/123
219/121.64

FOREIGN PATENT DOCUMENTS

| | | | |
|---|---|---|---|
| CN | 114799526 | A | 7/2022 |
| CN | 115106655 | A | 9/2022 |
| JP | 2016120506 | A | 7/2016 |

* cited by examiner

STEEL PLATE ASSEMBLY WELDED BY LASER WELDING AND LASER WELDING METHOD THEREOF

FIELD OF THE INVENTION

The present invention relates to a steel plate assembly welded by laser welding and a laser welding method for steel plates.

BACKGROUND OF THE INVENTION

Using a laser to weld thick steel plates is a common technology nowadays. For example, Chinese Patent Publication No. CN 115106655 A discloses a laser welding method for medium and thick steel plates. By moving the laser beam back and forth at a high speed in the direction parallel to the thickness of the steel plates during laser welding, the heat of the laser beam in the direction of the thickness of the steel plates is guaranteed to be uniform. This reduces hole fluctuations caused by unstable air pressure due to uneven vapor plumes in the depth direction inside the laser hole during deep welding, thereby improving hole stability, reducing defects, such as pores, humps, and nail head weld bead, improving weld quality, enhancing the absorption of the laser beam by the metal in the small hole, increasing the molten depth.

However, in the aforementioned patent, the thickness of the steel plates is allowed to be about 10 millimeters. The laser welding method is not applicable to thicker steel plates.

SUMMARY OF THE INVENTION

According to one aspect of the present invention, a laser welding method for steel plates is provided. The method comprises the following steps of: joining two steel plates, wherein a joint face of the steel plates extends along a joint line; using a laser to weld the joint face, wherein the laser has a power of between 20,000 and 30,000 watts, a welding angle is defined between the laser and the joint line, and the welding angle is between 0 degrees and 10 degrees; forming a molten region on the joint face using the laser, wherein the molten region extends along the joint line, the molten region has a molten depth of between 20 and 50 mm, and the molten region has a molten width of between 4 and 7 mm, after the molten region is cooled and solidified, the steel plates are combined with each other.

According to another aspect of the present invention, a steel plate assembly welded by laser welding is provided. The steel plate assembly comprises two steel plates and a molten region. The steel plates are joined. A joint face of the steel plates extends along a joint line. The molten region extends along the joint line. The molten region has a molten depth of between 20 and 50 mm. The molten region has a molten width of between 4 and 7 mm. The molten region is formed by welding the joint face using a laser. The laser has a power of between 20,000 and 30,000 watts. A welding angle is defined between the laser and the joint line. The welding angle is between 0 degrees and 10 degrees. After the molten region is cooled and solidified, the steel plates are combined with each other.

Preferably, at least one of the following conditions is met: a defocusing distance of the laser is between 0 and ±T/2 mm, T is a thickness of the steel plates; the laser has a power variation of ±3%, a wavelength of the laser is between 1030 and 1080 nanometers; a spot shape of the laser is circular or donut-shaped; a spot diameter of the laser is between 0.3 and 5 mm.

Preferably, when the steel plates are joined, the steel plates have a clearance (distance) between the steel plate edges in the range not exceeding 5% of a width of the steel plates.

Preferably, the laser has a welding speed ranging from 5 to 80 millimeters per second.

Preferably, a protective gas is provided to remove a plasma generated during welding of the laser. The protective gas is one of argon, helium, nitrogen and carbon dioxide, or a combination thereof.

According to the above technical features, the present invention can achieve the following effects:

The molten depth is 20 to 50 millimeters, so the laser welding method is applicable to thicker steel plates.

The molten width W is between 4 and 7 mm, which can enhance the laser welding strength between the steel plates.

DETAILED DESCRIPTION OF THE PREFERRED EMBODIMENTS

Embodiments of the present invention will now be described, by way of example only, with reference to the accompanying drawings.

Figure 1:
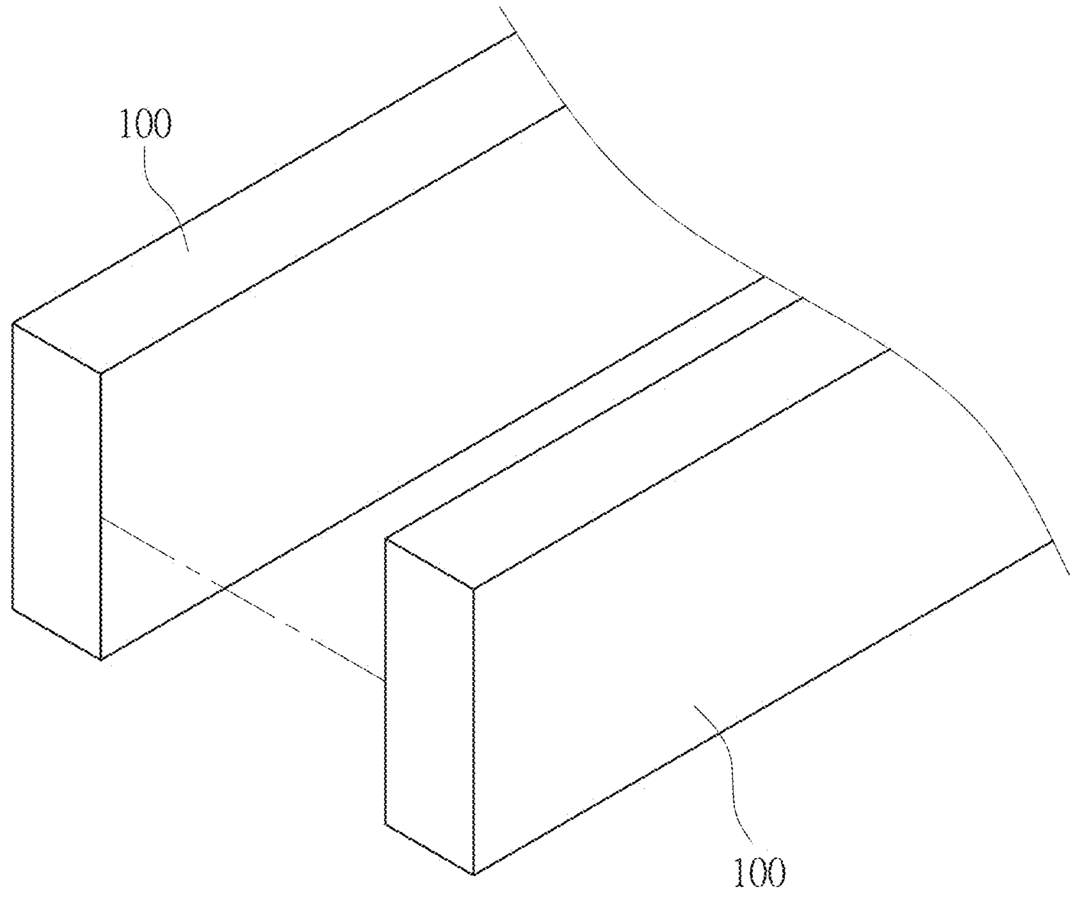
FIG. 1 is an exploded view of an embodiment the present invention.
Figure 2:
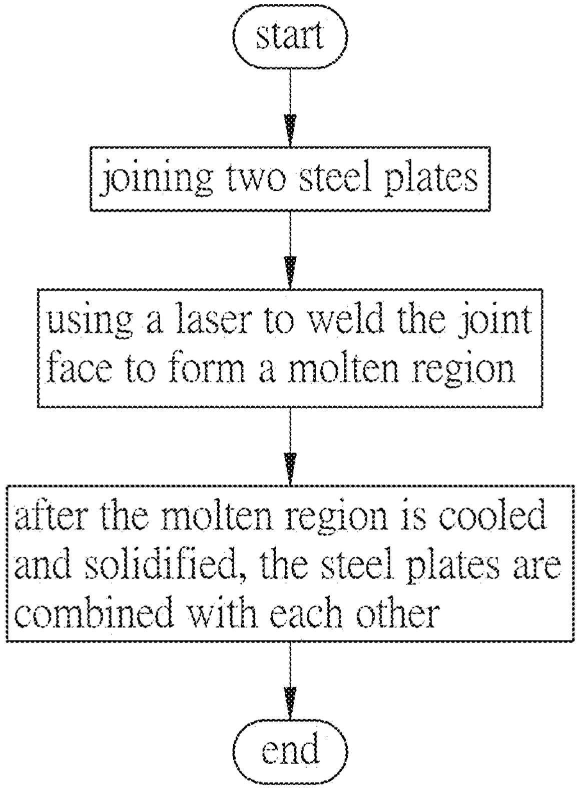
FIG. 2 is a flow block diagram of the embodiment of the present invention.
Figure 3:
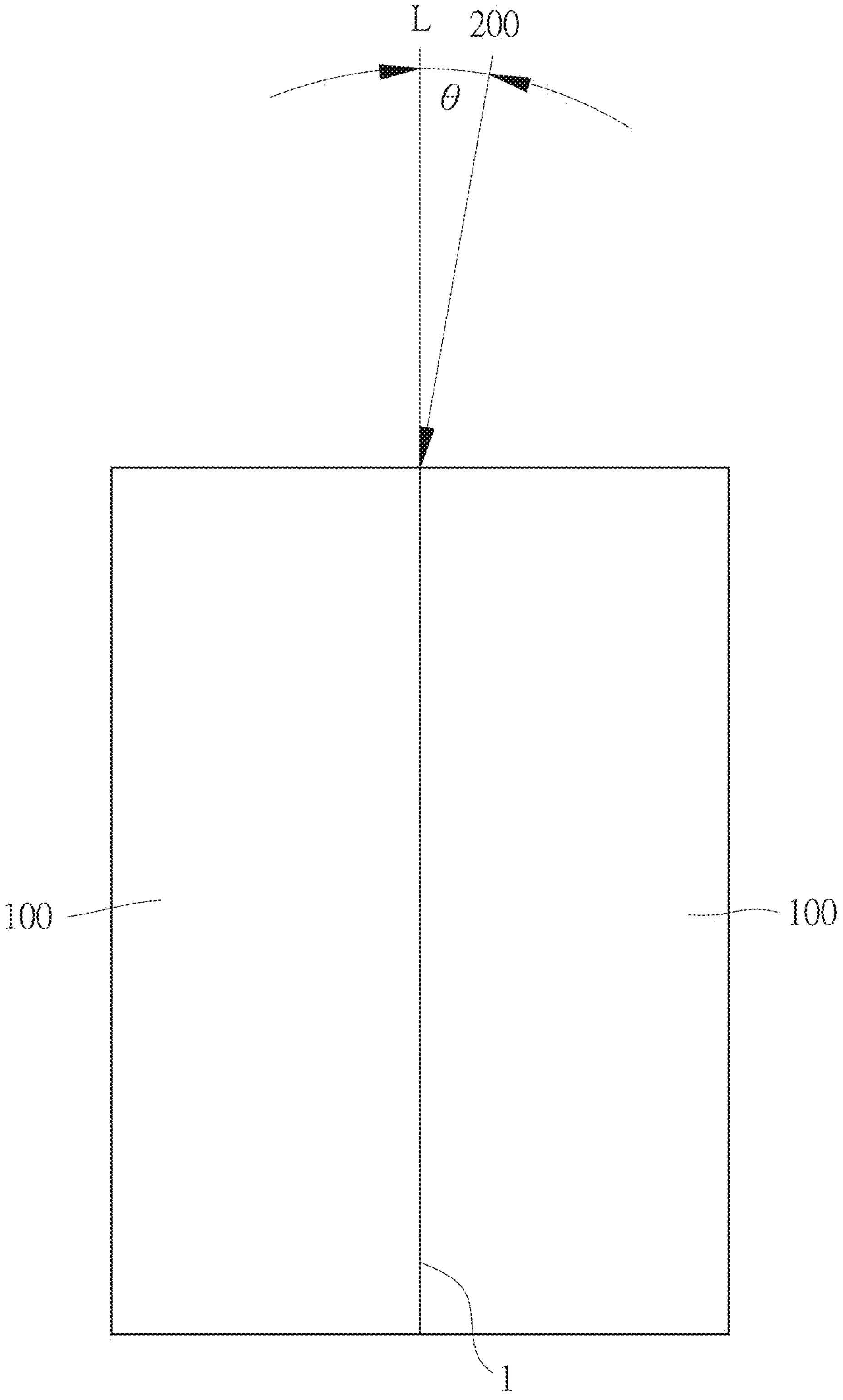
FIG. 3 is a first schematic view of the embodiment of the present invention, showing the welding angle.

As shown in FIG. 1 through FIG. 3, the present invention discloses a steel plate assembly welded by laser welding and a laser welding method for steel plates.

The laser welding method for steel plates comprises the following steps:

Two steel plates 100 are joined, i.e., positioned with their respective edges facing each other to define a joint face 1, as shown in FIGS. 1 and 3. The joint face 1 of the steel plates 100 extends along a joint line L. As shown in FIG. 1, the steel plates 100 have a clearance (a distance) between the edges of the steel plates facing each other. The clearance between the edges of the steel plates is preferably in a range of not more than 5% of the width of the steel plates 100.

The joint face 1 is welded using a laser 200. The power of the laser 200 is between 20,000 and 30,000 watts. A welding angle θ is defined between the laser 200 and the joint line L. The welding angle θ is between 0 degrees and 10 degrees.

Figure 4:
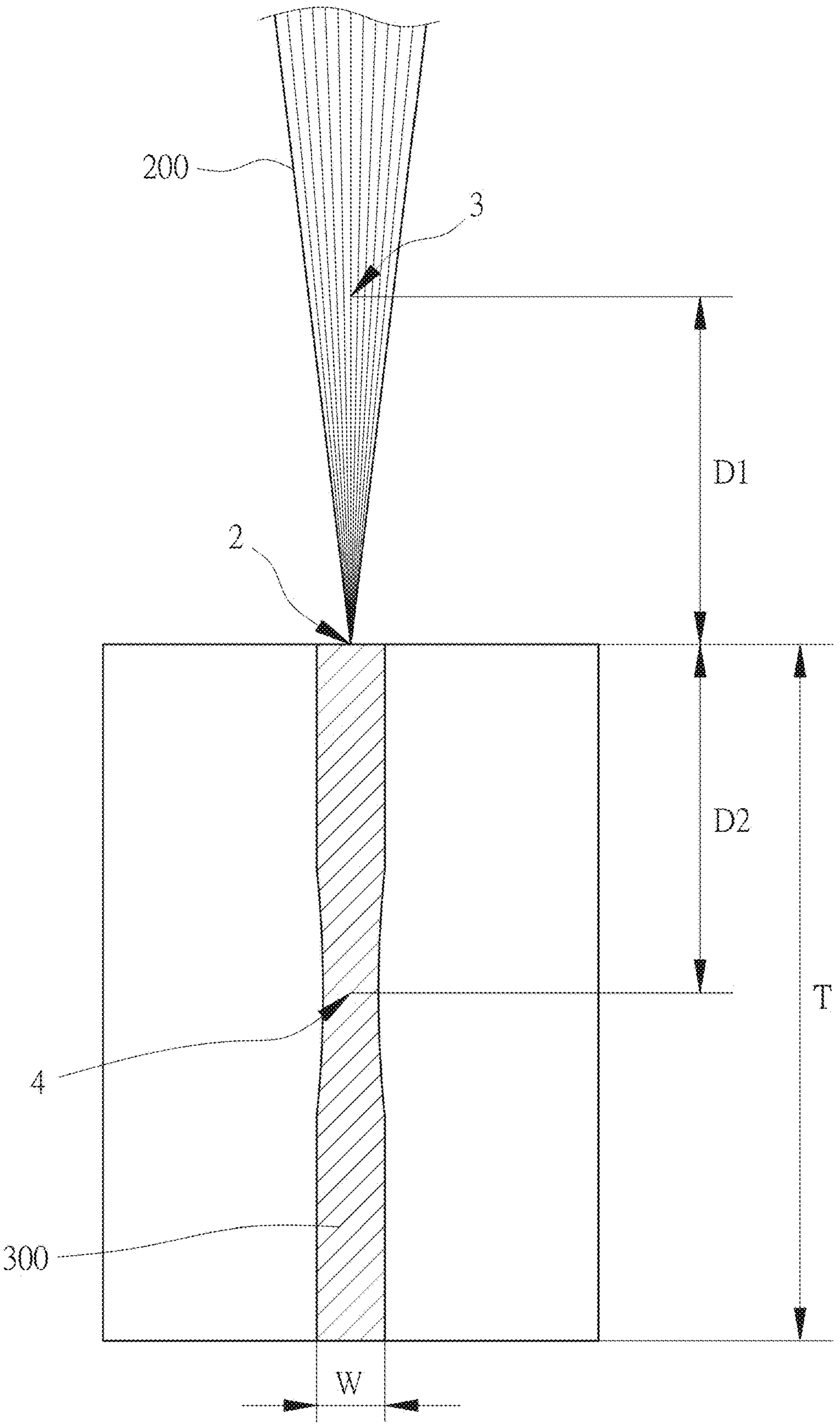
FIG. 4 is a second schematic view of the embodiment of the present invention, showing the defocusing distance.
Figure 5:
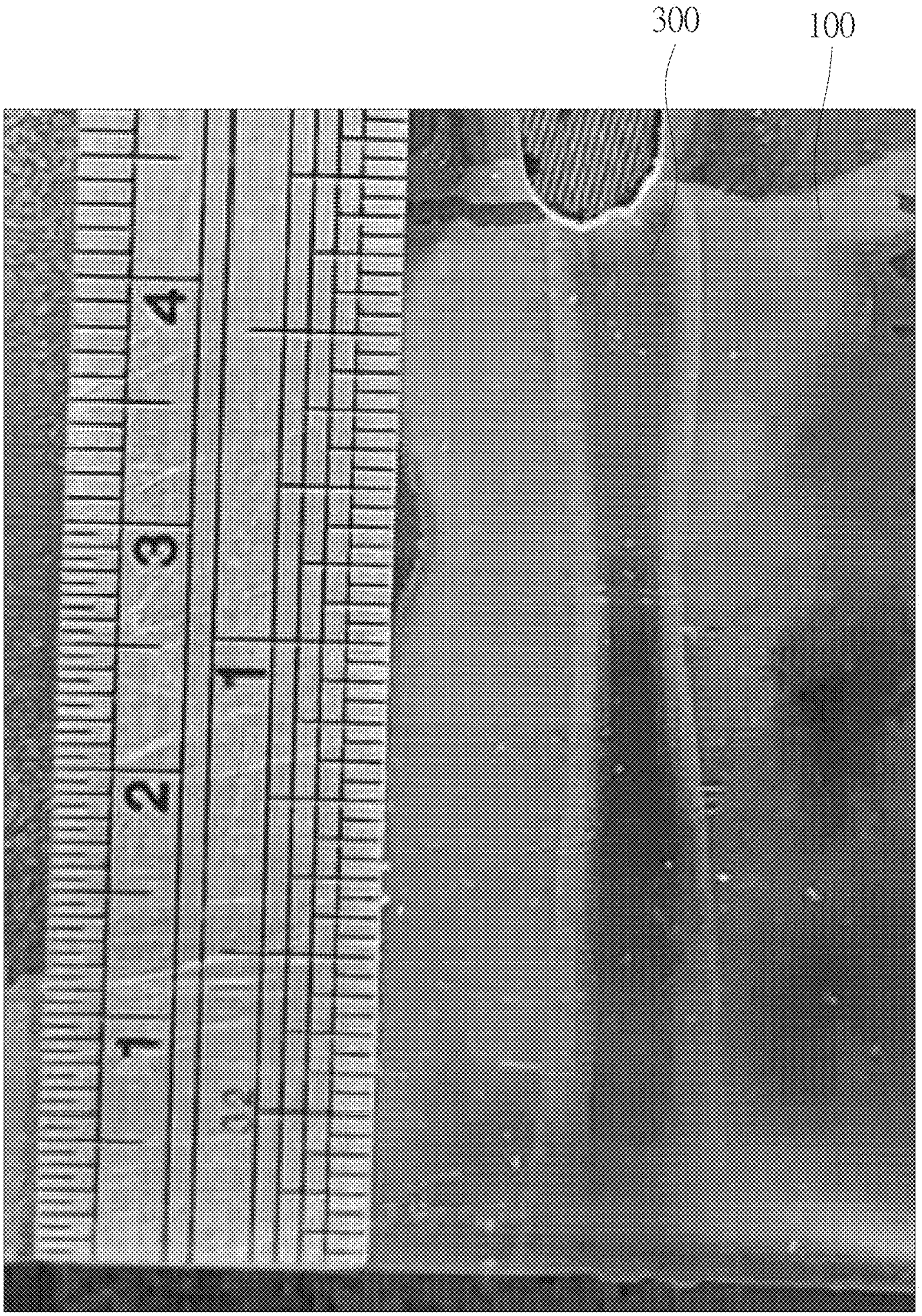
FIG. 5 is a first photograph of the embodiment of the present invention.

Please refer to FIG. 3 through FIG. 5, in cooperation with FIG. 2. When the joint face 1 is welded by the laser 200, a defocusing distance of the laser 200 is between 0 and ±25 mm. That is, the positive defocusing distance D1 is up to 25 mm, and the negative defocusing distance D2 is up to −25 mm, which is equivalent to half of the thickness T (between 20 and 50 mm) of the steel plates 100. If the surface of the steel plates 100 serves as the focal point 2, the positive defocusing point 3 will be 25 mm above the focal point 2, and the negative defocusing point 4 will be 25 mm below the focal point 2.

The laser 200 has a power variation of ±3%. The wavelength of the laser 200 is between 1030 and 1080 nanometers. The laser 200 has a welding speed ranging from 5 to 80 millimeters per second. Preferably, the spot shape of the laser 200 is circular or donut-shaped, and the spot diameter of the laser 200 is between 0.3 and 5 mm.

The above-mentioned values may be changed according to the thickness T of the steel plates. For example, when the thickness T of the steel plates is between 40 and 50 mm, the power of the laser 200 may be 30,000 watts, the welding speed is between 5 and 80 millimeters per second, and the spot diameter of the laser 200 is between 0.3 and 5 millimeters.

A protective gas is used to remove a plasma generated during the welding of the laser 200. The protective gas is one of argon, helium, nitrogen and carbon dioxide, or a combination thereof.

By changing the defocusing distance and the power variation, the laser 200 enables the joint face 1 to form a molten region 300 extending along the joint line L.

The molten depth of the molten region 300 is between 20 and 50 mm, which is equivalent to the thickness T of the steel plates 100. The molten width W of the molten region 300 is between 4 and 7 mm. After the molten region 300 is cooled and solidified, the steel plates 100 are combined with each other to form a steel plate assembly.

Figure 6:
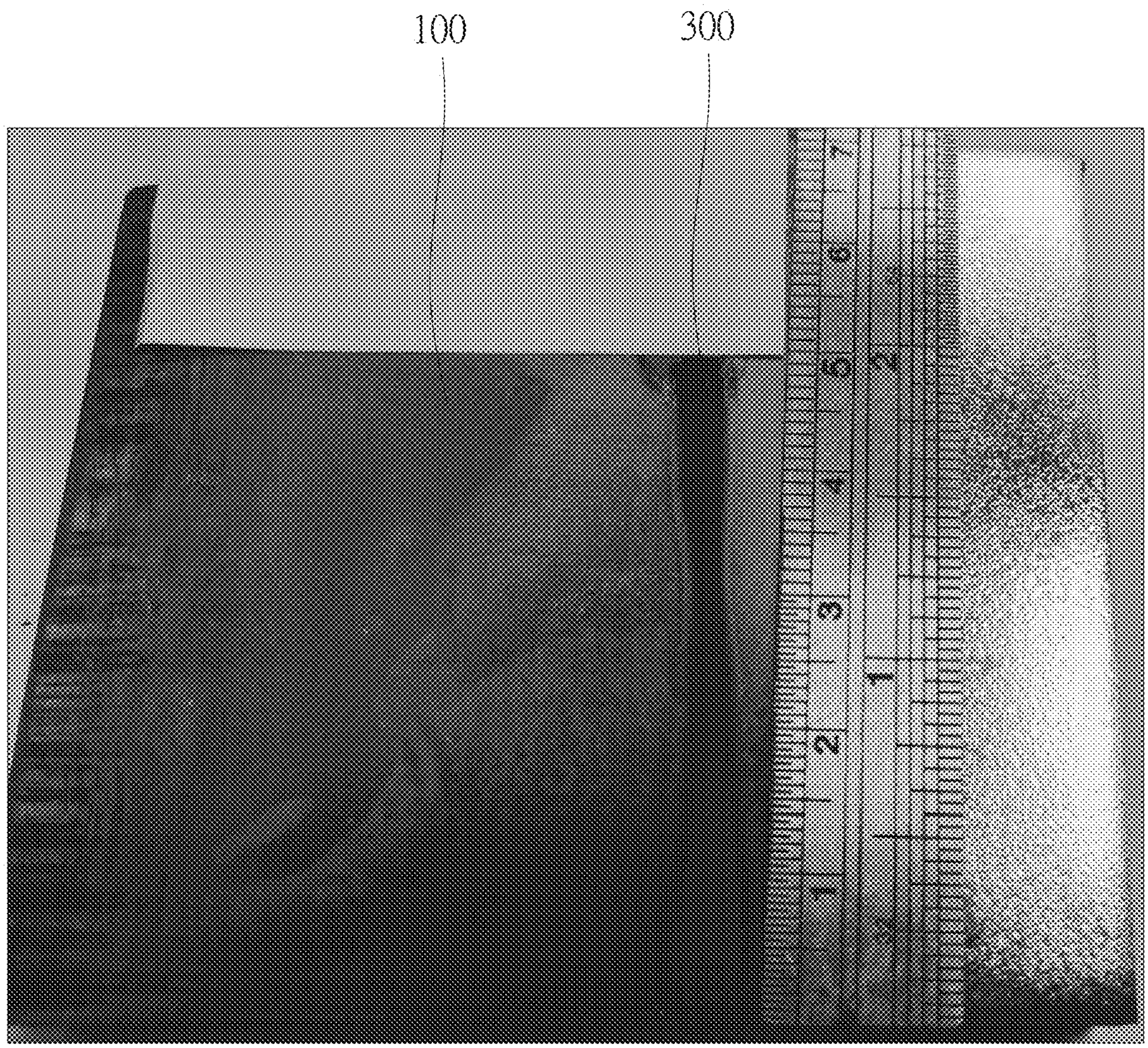
FIG. 6 is a second photograph of the embodiment of the present invention.
Figure 7:
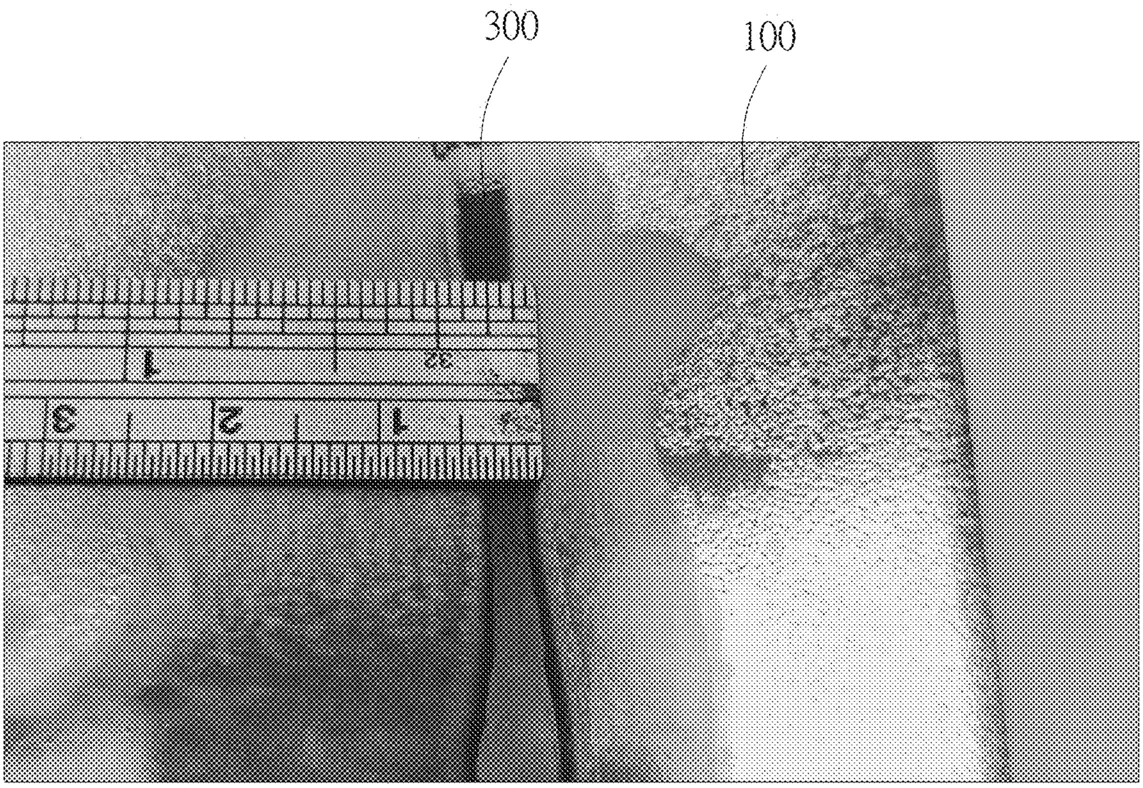
FIG. 7 is a third photograph of the embodiment of the present invention.
Figure 8:
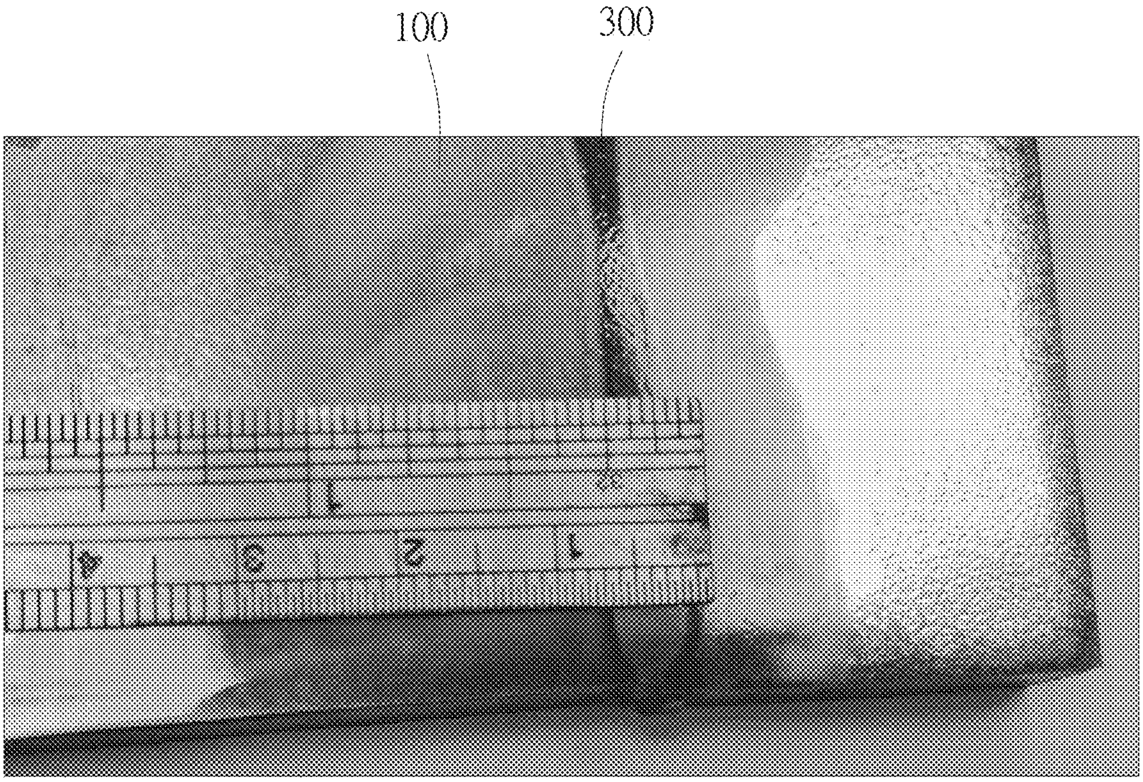
FIG. 8 is a fourth photograph of the embodiment of the present invention.

Please refer to FIG. 6 through FIG. 8, in cooperation with FIG. 4. As can be seen from the photographs of the actual steel plate assembly manufactured by the laser welding method, the molten depth is indeed up to 50 mm, and the molten width W is indeed between 4 and 7 mm.

The molten depth is 20 to 50 millimeters, so the laser welding method is applicable to thicker steel plates 100. The molten width W is between 4 and 7 mm, which can enhance the laser welding strength between the steel plates 100.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A laser welding method for steel plates, comprising the following steps of:

positioning two steel plates with respective edges of the steel plates in proximity to each other and facing each other, wherein a joint face of the steel plates is defined by said respective edges of the steel plates, the joint face extending along a joint line;

using a laser to weld the joint face, wherein a defocusing distance of the laser is within ±T/2 mm, wherein T is a thickness of the steel plates, wherein the thickness of the steel plates ranges from 20 mm to 50 mm, wherein the laser has a power of between 20,000 and 30,000 watts, wherein a welding angle is defined between the laser and the joint line, and wherein the welding angle is between 0 degrees and 10 degrees; and forming a molten region on the joint face using a laser beam of the laser, wherein the molten region extends along the joint line, wherein the molten region has a molten depth of between 20 and 50 mm, and wherein the molten region has a molten width of between 4 and 7 mm, after the molten region is cooled and solidified, the steel plates are combined with each other.

2. The laser welding method as claimed in claim 1, wherein at least one of the following conditions is met: the laser has a power variation of ±3%, a wavelength of the laser is between 1030 and 1080 nanometers; wherein a spot shape of the laser beam is circular; and wherein a spot diameter of the laser beam is between 0.3 and 5 mm.

3. The laser welding method as claimed in claim 1, wherein in the step of positioning the steel plates with said respective edges of the steel plates in proximity to each other and facing each other, the steel plates have a clearance between said respective edges of the steel plates in a range of not more than 5% of a width of the steel plates.

4. The laser welding method as claimed in claim 1, wherein the laser has a welding speed ranging from 5 to 80 millimeters per second.

5. The laser welding method as claimed in claim 1, further providing a protective gas to remove a plasma generated during welding by the laser, wherein the protective gas is selected from the group consisting of argon, helium, nitrogen, carbon dioxide, and a combination thereof.

6. A steel plate assembly welded by laser welding, comprising:

two steel plates positioned with respective edges of the steel plates in proximity to each other and facing each other, a joint face of the steel plates being defined by said respective edges of the steel plates, wherein the joint face extends along a joint line;

a molten region, extending along the joint line, the molten region having a molten depth of between 20 and 50 mm, the molten region having a molten width of between 4 and 7 mm;

wherein the molten region is formed by welding the joint face using a laser beam of the laser, wherein a defocusing distance of the laser is within =T/2 mm, wherein T is a thickness of the steel plates, wherein the thickness of the steel plates ranges from 20 mm to 50 mm, wherein the laser has a power of between 20,000 and 30,000 watts, wherein a welding angle is defined between the laser and the joint line, wherein the welding angle is between 0 degrees and 10 degrees, and wherein after the molten region is cooled and solidified, the steel plates are combined with each other.

7. The steel plate assembly as claimed in claim 6, wherein at least one of the following conditions is met wherein the laser has a power variation of ±3%, wherein a wavelength of the laser is between 1030 and 1080 nanometers; wherein a spot shape of the laser beam is circular; and wherein a spot diameter of the laser beam is between 0.3 and 5 mm.

8. The steel plate assembly as claimed in claim 6, wherein when the steel plates are positioned with said respective edges of the steel plates in proximity to each other and facing each other, the steel plates have a clearance between said respective edges of the steel plates in a range of not more than 5% of a width of the steel plates.

9. The steel plate assembly as claimed in claim 6, wherein the laser has a welding speed ranging from 5 to 80 millimeters per second.

10. The steel plate assembly as claimed in claim 6, wherein a protective gas is provided to remove a plasma generated during welding by the laser, wherein the protective gas is selected from the group consisting of argon, helium, nitrogen, carbon dioxide, and a combination thereof.

* * * * *